(12) United States Patent
Mesh et al.

(10) Patent No.: US 9,304,272 B2
(45) Date of Patent: Apr. 5, 2016

(54) EO DEVICE FOR PROCESSING DATA SIGNALS

(71) Applicant: Compass Electro-Optical Systems Ltd., Netanya (IL)

(72) Inventors: Michael Mesh, Kfar Saba (IL); Michael Laor, Zichron Yaakov (IL)

(73) Assignee: Compass Electro Optical Systems Ltd., Netanya (IL)

( * ) Notice: Subject to any disclaimer, the term of this patent is extended or adjusted under 35 U.S.C. 154(b) by 320 days.

(21) Appl. No.: 13/832,703

(22) Filed: Mar. 15, 2013

(65) Prior Publication Data

US 2014/0270627 A1 Sep. 18, 2014

(51) Int. Cl.
*G02B 6/12* (2006.01)
*G02B 6/43* (2006.01)
*G02B 6/42* (2006.01)

(52) U.S. Cl.
CPC ............ *G02B 6/43* (2013.01); *G02B 6/4246* (2013.01); *G02B 6/4269* (2013.01); *G02B 6/4278* (2013.01); *G02B 6/4249* (2013.01)

(58) Field of Classification Search
None
See application file for complete search history.

(56) References Cited

U.S. PATENT DOCUMENTS

| | | | |
|---|---|---|---|
| 5,858,814 A | 1/1999 | Goossen et al. | |
| 6,005,262 A | 12/1999 | Cunningham et al. | |
| 6,396,967 B1 * | 5/2002 | Suzuki et al. | 385/14 |
| 6,477,286 B1 * | 11/2002 | Ouchi | 385/14 |
| 6,671,947 B2 * | 1/2004 | Bohr | 29/846 |
| 6,780,661 B1 | 8/2004 | Liu | |
| 6,785,447 B2 * | 8/2004 | Yoshimura et al. | 385/42 |
| 6,985,645 B2 * | 1/2006 | Cohen et al. | 385/14 |
| 7,230,278 B2 * | 6/2007 | Yamada et al. | 257/80 |
| 7,271,461 B2 * | 9/2007 | Dutta | 257/432 |
| 7,438,482 B2 * | 10/2008 | Asari et al. | 385/89 |
| 7,477,811 B1 * | 1/2009 | Dellmann et al. | 385/14 |
| 7,532,785 B1 * | 5/2009 | Beausoleil et al. | 385/14 |
| 8,680,458 B2 * | 3/2014 | Sievers | 250/227.11 |

(Continued)

FOREIGN PATENT DOCUMENTS

JP 2005-252040 A * 9/2005 ............... G02B 6/42

OTHER PUBLICATIONS

International Search Report and Written Opinion for International Application No. PCT/IB14/01573 mailed on Dec. 30, 2014 (7 pages).

*Primary Examiner* — Mike Stahl
(74) *Attorney, Agent, or Firm* — Wilmer Cutler Pickering Hale and Dorr LLP

(57) ABSTRACT

The present disclosure allows connection between optical and electrical devices at high frequencies and high bit rate. The present disclosure provides an electro-optical device that includes an optical interface for optical signal transmission and reception; an electrical interface for electrical signal transmission and reception; a data and signal unit located inside an integrated circuit chip coupled to the optical interface and to the electrical interface for manipulating data received through said interfaces; and a processing unit located inside the integrated circuit chip coupled to the optical interface and to the electrical interface for processing digital data received through said interfaces. The present disclosure provides devices that achieve smaller physical dimensions with an increased number of interfaces to allow greater throughput of data into and out of the integrated circuit. This allows increased input/output bandwidth and increased amount of logic can be placed directly into the integrated circuit.

13 Claims, 2 Drawing Sheets

(56) References Cited

U.S. PATENT DOCUMENTS

| | | |
|---|---|---|
| 2002/0003232 A1* | 1/2002 | Ahn et al. ............... 257/81 |
| 2002/0025099 A1 | 2/2002 | Williams et al. |
| 2003/0026556 A1 | 2/2003 | Mazotti et al. |
| 2004/0218372 A1* | 11/2004 | Hamasaki et al. ............ 361/767 |
| 2007/0223935 A1* | 9/2007 | Asai et al. ............... 398/164 |
| 2008/0013959 A1* | 1/2008 | Ishigami ............... 398/135 |
| 2008/0107374 A1* | 5/2008 | Bozso et al. ............ 385/14 |
| 2010/0054671 A1* | 3/2010 | Ban et al. ............... 385/88 |
| 2011/0165707 A1 | 7/2011 | Lott et al. |
| 2012/0106562 A1 | 5/2012 | Laor et al. |
| 2012/0163811 A1* | 6/2012 | Doany et al. ............ 398/41 |
| 2012/0280344 A1* | 11/2012 | Shastri et al. ............ 257/432 |
| 2012/0292781 A1 | 11/2012 | Tremlett et al. |

* cited by examiner

EO DEVICE FOR PROCESSING DATA SIGNALS

FIELD OF TECHNOLOGY

The present disclosure relates to improved connections for an electro-optical device for processing of data and signals, and a connection architecture for such a device.

BACKGROUND

The conventional art includes optical devices for data reception and transmission, such as used for optical inter-chip interconnects and the like. For example, Vertical Cavity Surface Emitting Lasers (VCSELs) are used for optical interconnects due to their performance (high-modulation bandwidth, low power consumption, high efficiency) and manufacturing advantages (high-volume production, wafer-level testing, and ease of integration). The low power requirements of these VCSELs allow simple electronic driver circuits to be used. VCSELs are generally about hundreds of microns in size.

Conventional art also includes electrical devices, such as signal manipulation devices (e.g., switches and cross-connects) or data processing devices (e.g., mathematical processors or DSP). Current technologies, such as Complementary Metal Oxide Semiconductor (CMOS) technology, produce devices that are on the order of tens of nanometers in size.

Usually, connections are provided between these optical and electrical devices, using serializers and deserializers, which work at high frequency (high bit rate).

However, these combined solutions have various disadvantages, such as high energy consumption and large size, and the devices which incorporate them have a large number of components and, consequently, are very complex systems, which can also result in possible problems of reliability. Thermal stability and limitations of possible achieved high bit rate are well known issues with such approaches.

Moreover, there are technology difficulties which prevent integration of optical devices and processing systems on the same silicon microchip, so that devices which incorporate them are usually formed of at least two distinct and physically separate elements, the electro-optical part and the processor or switch units for manipulating the data acquired.

For example, in order to modulate light from optical sources, such as VCSELS, and to receive the signals with high bit rate, high speed electronic circuitry is needed. In order to achieve these high frequencies and high bit rate signals, such electronic circuitry has been built using SiGe materials. This means that, in order to build an integrated device, three layers of different materials must be connected—CMOS for the logic or processing device, an SiGe layer, to build high speed driving/receiving electronic modules and finally, a GaAs and/or InP layer for the optoelectronic devices. Thus, it is very difficult to construct such an integrated device.

Generally, the conventional art utilizes a combination of different devices, with some devices that combine one or more functions, albeit with an incomplete level of integration.

SUMMARY

Unlike conventional art that utilizes separate devices, the present disclosure relates to an integrated circuit chip including a plurality of surface contacts on a top surface of a chip, a plurality of back contacts on back surfaces of the chip, an optical interface coupled to the surface contacts, an electrical interface coupled to the plurality of back contacts, processing circuitry in the chip coupled to contacts selected from the surface contacts and the back contacts.

In particular, the present disclosure relates to an integrated circuit chip that includes a plurality of optical interfaces coupled to contacts on a top surface of the chip, a plurality of electrical interfaces coupled to contacts on back surfaces of the chip, and processing circuitry in the chip coupled to the optical and electrical interfaces.

Utilizing separate devices requires additional connection elements between them, requiring more space and power. Data flow is not optimized and some protocol or/and signal level matching is needed, as well. This leads to additional power and speed losses. The present disclosure overcomes the shortcomings of the conventional art and presents further advantages in terms of versatility in application.

In addition, the present disclosure allows connection between optical and electrical devices at high frequencies and high bit rate without use of SiGe materials as was carried out in the conventional art. Accordingly, only two layers of different materials are needed for connection that include Si CMOS for the logic or processing device and a GaAs and/or InP layer for the optoelectronic devices. Use of a SiGe that was needed in the conventional art to achieve high frequencies and high bit rate signals is removed. The present disclosure provides integrated circuit chips that achieve smaller physical dimensions that allow use in numerous additional applications. For example, while conventional art required the use of two to three different chips, the present disclosure allows utilization of a single integrated circuit chip to achieve the same function.

The present disclosure further allows integrated circuit chips to be used in a wider range of applications. For example, whereas the use of Si, SiGe, InP and/or GaAs devices required consideration of all the different materials present in the device, the present disclosure allows, for example, the omission of SiGe layer allowing further simplification of thermal matching considerations.

In addition, the present disclosure provides integrated circuit chips that can achieve reduced energy consumption. For example, about five to ten times reduction in energy consumption as compared to conventional devices may be possible by employing the techniques described herein to interconnect the electrical and optical devices in a single integrated circuit chip. Without wishing to be bound by theory, such reduced energy consumption may be possible by providing the described interconnect architecture in an integrated circuit chip that provides connections between optical and electrical components at much shorter distances that lead to reduced pathways and lower power losses.

Such attendant benefits over the conventional art can be achieved while still offering the processing power needed to manage and process the data sent and received by the optical and electrical interfaces.

In particular, the device is integrated in a single chip, such as an application specific integrated circuit chip, and able to manipulate the information content from the signals acquired by optical and electrical interfaces, without requiring separate and discrete processing elements. This may be accomplished by utilizing the top surface of the chip for optical interface mounting contacts and back side of the integrated chip for electrical connections. In certain embodiments, even analog circuitry, such as amplifiers for photodiode current, can be assembled in the digital chip as a macro block.

There is thus provided, in accordance with some embodiments of the present disclosure, an electro-optical device for processing of data and signals, including an integrated chip with a data unit and a signal unit, electrical and optical interfaces and a processing unit. The processing unit includes at least one processor, which can be an arithmetical processor or any other type of processor, including a digital signal processor (DSP). The data and signal units and processor units preferably are made using CMOS technology, and are integrated on the same silicon element to implement the device in a single chip. The data units manipulate data by using logical or arithmetical or other operations. For example, the signal unit can provide data encoding/decoding to/from the physical level. The data unit can provide storage, access. The processing unit can provide a programmable interface to data. The signal unit can provide signal switching, add-drop, and cross-connect, and similar functionalities by use of controllable drivers. The optical interfaces may include optical sources (e.g., VCSELs) and photo receivers (e.g., photodiodes), which are mounted on the same chip by using, for example, flip-chip assembly technology, and which are suitably connected to each other, each having a specific function. Contacts on these optical interfaces can be coupled to contacts on the surface of the chip, permitting high bit rate transmission and reception of optical signals including large amounts of data.

Full internal connectivity between processing units and interfaces is provided inside the chip. Numerous different ways to connect the processing units and interfaces can be utilized. In contrast to conventional techniques that required use of external connections for different chips (e.g., printed circuit boards), the present disclosure can provide connections, such as internal bus or vias.

In some embodiments, the device is programmable, rather than fixed or dedicated. For example, the signal unit may have some tunable/programmable parameters and gates. The data units may have memory, and one or more programmable controllers that can perform "per logical interface" data manipulation. The processing unit can perform programmable manipulation under external control and embedded program memory to save (and run) downloaded code. Providing such programmable functionality may allow the integrated circuit chip to operate as a universal device, providing a wide range of functionality.

According to some embodiments, the optical interfaces include analog circuitry coupling the optical sources and photodetectors to the integrated circuit chip, such as a CMOS chip. The optical sources may be composed of a matrix of active light emitting elements, such as VCSELs, which convert electric data to light radiation. The photodetectors may be composed of a matrix of light receiving elements, such as PIN photodiodes, which convert the light radiation to electric data. Both VCSELs and photodiodes can be organized in matrices of different sizes and in different orders. The optical devices are also electrically connected, for example, by flip-chip technology, to a data and signal unit. Such data and signal unit includes electronic circuitry to drive the VCSELs and electronic circuitry to amplify the electric signal output by the photodetectors.

In some embodiments, the processing unit includes at least one processor, able to manipulate desired informational content received from the electrical and optical interfaces or from the data and signal units, as well as to send this information back to the optical and electrical interfaces.

The use of CMOS technology to make both the data manipulation unit and the processing unit allows integrating both these functions on a single silicon chip, internally connected to the optical interfaces, achieving an intelligent electro-optical device for data manipulation and processing. That is, the CMOS technology permits implementation, in a single silicon chip of small size and with limited energy consumption, of a system capable of information manipulation and processing, which can be reprogrammed and reconfigured, by defining the connections of the data and signal units and processor(s) and electrical and optical interfaces, using different algorithms, according to the specific field of application. Alternatively, any other integrated circuit technology which permits such implementation can be utilized.

Instead of utilizing CMOS→SiGe→GaAs/InP connection technology utilized in the conventional arts, the present disclosure reduces the interconnection to CMOS→GaAs/InP. Conventional techniques which only utilized electrical connectivity to perform all of the required data processing are limited in the amount of data that can be processed. Adding optical connectivity directly to the integrated circuit chip, such as a CMOS chip, can provide further improvements in the amount of data that can be processed as well as provide a more efficient device in terms of power consumption.

In sum, the present disclosure allows increased input/output bandwidth and increased amount of logic can be placed directly into the integrated circuit.

BRIEF DESCRIPTION OF THE DRAWINGS

These and other characteristics of the present invention will be apparent from the following description of a preferred embodiment, given as a non-restrictive example, with reference to the attached drawings wherein.

DETAILED DESCRIPTION

The present disclosure relates to a chip having significantly more In/Out capability than conventional chips and having the capability of processing both optical and electrical data in a single integrated circuit chip. This is accomplished by providing a plurality of optical interfaces coupled to surface contacts on a top surface of the chip, a plurality of electrical interfaces coupled to back contacts on a back surface of the chip, and processing circuitry in the chip coupled to the optical and electrical interfaces.

One embodiment is an electro-optical device for the manipulation and processing of data and signals, preferably made by means of high integration CMOS technology. The device includes optical and electrical interfaces, components for acquiring information represented by digital data and analog signals, at least one electronic digital processor unit able to process the data and signals, and data and signal units to manipulate data or signals, accordingly. Typically, connections with external electrical devices can be implemented by electrical interfaces coupled to back contacts, while connections with external optical devices can be implemented by optical interfaces coupled to surface contacts, although any combination is possible.

Using the same silicon production technology, both for the data and signal units and also for the processing unit, as well as using an assembly of optical interfaces, allows integrating all the components on a single integrated circuit (or chip), with advantages in terms of space, power consumption and operating efficiency.

In some embodiments, the devices of the present disclosure are applied to data and signal manipulation in the field of data and telecommunications, computer grids, inter-box, inter-board and inter-chip connectivity, and similar applications.

Figure 1:
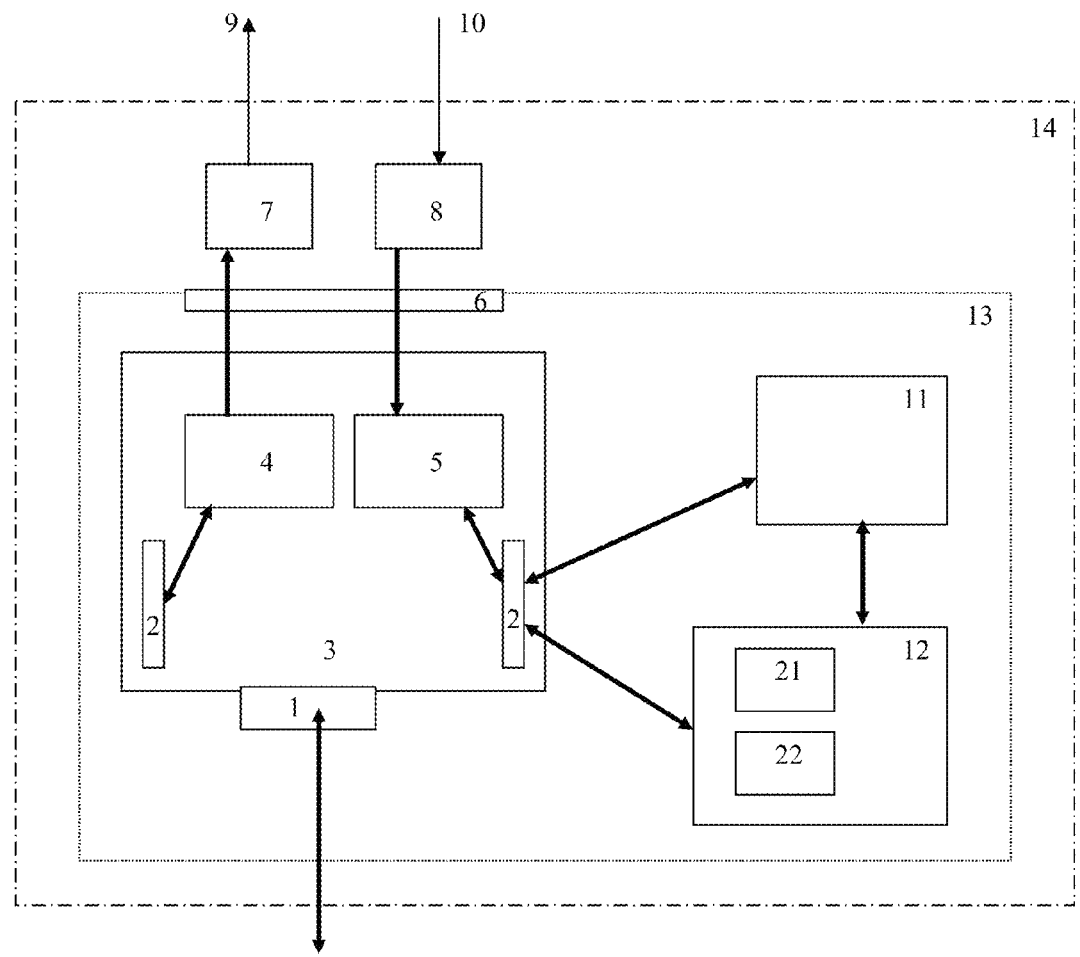
FIG. 1 shows a typical functional block diagram of an electro-optical device, constructed and operative according to embodiments.

With reference to FIG. 1, there is shown an electro-optical (EO) device 14. EO device 14 includes an electrical interface 1 for reception and transmission of electrical signals), a communication unit 3, optical transmission interfaces 7 for light transmission, optical reception interfaces 8 for light reception, a data and signal unit 11, and a processing unit 12, including at least a logical or mathematical processor 21. Optical transmission interfaces 7 can include optical sources, e.g., VCSELs, including connections to connect the optical sources with communication unit 3. Optical reception interfaces 8 can include optical detectors, e.g., photodiodes, including connections to connect the optical detectors with communication unit 3. The communication unit 3 can include optical source (VCSEL) driver circuitry 4, photodiode amplification circuitry 5, and electrical circuitries 2 to provide connectivity to other components in the device 14. In certain embodiments, device 14 is a single integrated chip that includes optical sources and/or optical detectors.

In certain embodiments, the data and signal unit 11, the processing unit 12, and communication unit 3 can be made using CMOS technology, or other integrated circuit technology having similar capabilities, and can be integrated in a single silicon element 13. This may achieve an integrated type device with limited size and energy consumption. For example, a size of about 20×20 mm, with the attached optics adding a few millimeters in the height direction may be possible, allowing the integrated circuit chip of the present disclosure to be utilized in a variety of different applications. In addition, energy consumption of about 50-70 W for an ASIC that includes all desired electronic circuitry and optical interfaces with more than 1 Terabit per second full duplex data transmission through attached optical interconnect may be possible.

In the silicon element 13 are also provided components (not shown) for transmitting data between blocks inside the device 14 (for example, serializers and de-serializers), as well as other components for digital data error correction, if needed.

According to some embodiments, optical transmission interfaces 7 can include a matrix of optical sources (e.g., VCSELs) of the type with N×M active elements which perform conversion of an electric (digital) signal to transmitted light 9, and optical reception interfaces 8 can include a matrix of photo-detectors, such as photodiodes, of the type of N×M (or other) to convert received light 10 to an electrical (digital) signal. These optical interfaces 7 and 8 can be assembled on silicon element 13 (e.g., CMOS chip) by any suitable connection method (for example, flip-chip bonding), using an assembly element 6 including a plurality of surface contacts (for example, bumps or pillars). In this case, the assembly element 6 can act as an electrical contact between the electrical signals coming in and out of the optical interfaces 7 and 8 and the circuitry inside device 14, such as optical source drivers and amplifiers and limiters for photo detectors.

In certain embodiments, data and signal unit 11 is able to manipulate data by switching, add-drop, cross-connect, routing, etc. Unit 11 can be a combination of software and hardware. In the case of analog signal manipulation, the device can perform amplification, broadcasting, switching, etc. In the case of digital data, it can perform some or all of the operations mentioned above.

In certain embodiments, processing unit 12 can include at least one processor 21, which can be a logical or mathematical processor or a specialized DSP. In certain embodiments, processing unit 12 can further include a memory block 22 to manage and manipulate the information received, store information in memory, and make information properly available for further use and transmission.

In certain embodiments, the processing unit 12 can perform various different types of computations on various different levels, depending on the application. For example, the processor 21 can be used as a regular computational device (for mathematical operations) or as a data processing device using some specific algorithms (Digital Signal Processor). Or, as mentioned below, the processor can operate both ways. Its functionality can depend on the specific application. For example, in communication devices, mostly signal switching and/or routing functions may be used. In data processing devices, switching and routing of digital signal processor and data switching/routing are useful, if done in one chip. In both cases, the processor operates the proper devices—switches, amplifiers, memories, and the like—and/or performs computing operations, depending on the required functionality and the software used.

The proposed device operates in two ways, or in a combined mode: signal manipulation, data processing or both of them (combined mode).

In the signal manipulation mode, mainly the data and signal unit 11 may be involved. A signal obtained from the electrical interfaces 1 or optical reception interfaces 8 comes through the chip from the communication unit 3 to the data unit 11 and is operated on by an algorithm, and is switched, cross-connected, and add-dropped or routed. In accordance with a specified algorithm, the manipulated data, wholly or partially, can be directed via the communication unit 3 to the output of the device 14 via, for example, the optical transmission interfaces 7 and/or electrical interfaces 1 or can be directed to the processing unit 12 for further specific processing, such as carrying out communication protocols like UDP, TCP, Ethernet, and the like.

In the data processing mode, the processing unit 12 may be mainly involved. Data obtained from the electrical interfaces 1 or optical reception interfaces 8 comes through the chip to the processing unit 12 and is operated on by algorithms, logically or mathematically or otherwise. Such algorithms include algorithms described above as well as additional data driven processing including lookup, clustering, and the like. The data can be classified, searched, organized, etc. Processed data can be extracted from or added to the signal of the data unit 11. This means that some amount of data can be processed (operated on by a specific algorithm, for example, divided by something or multiplied or another operation) and the result can be combined with the other data which did not require such manipulation. Manipulation can be done by and on any amount of data, inserted or extracted or built inside the chip as a result of any other operation, as well as information received through any interface with the external world. After processing, the data—wholly or partially—can be directed to the output of the device 14 via, for example, optical transmission interfaces 7 and/or electrical interfaces 1 or to the data unit 11 for further manipulation (like switching).

When both the data unit 11 and the processing unit 12 are involved, the device 14 operates in a combined mode. The combined mode can be useful in applications where, for example, a searching operation is followed by switching or routing of a result obtained in the searching operation.

Figure 2:
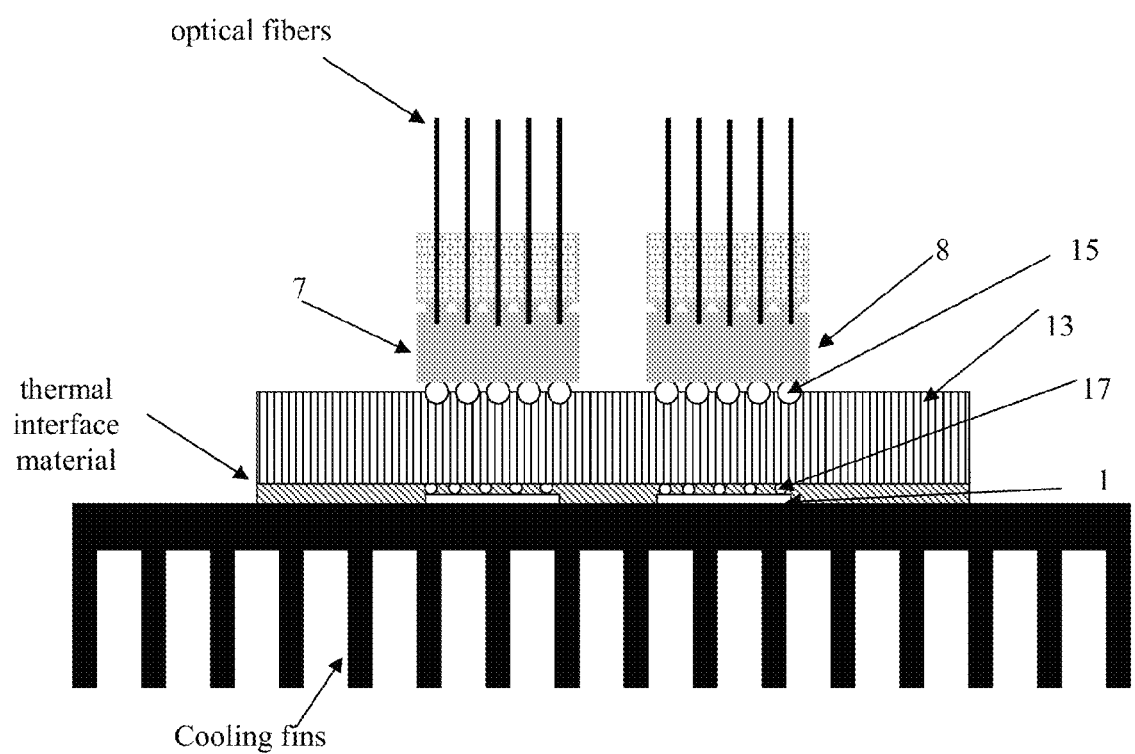
FIG. 2 is a schematic side view of a chip according to certain embodiments.

FIG. 2 shows schematically the combined integrated circuit chip 14 showing silicon element 13 with optical interfaces 7 and 8 and electrical interfaces 1. As shown, the optical interfaces 7 and 8 are on a top surface of the silicon element 13 while electrical interfaces 1 are on the back surface of the silicon element 13. The optical interfaces 7 and 8 can be connected to the silicon element 13 through surface contacts 15 and the electrical interfaces 1 can be connected to the silicon element 13 through back contacts 17.

With the combination of electrical and optical interfaces, the electro-optical device 14 of the present disclosure can receive and transmit a very large amount of information. A typical optical interface 7 or 8, based on VCSELs and modern photodiodes, can work at least with 10 Gbps rate, and the matrix of optical elements can be of 20×20 elements, at least. In this case, 4 Tbps full duplex throughput is achievable. When the pitch between the elements is about 250 micron, such a matrix will fill only 5 mm×5 mm on the surface of the chip. Two such matrices (i.e., sources and detectors), will require only about 5 mm×10 mm, which still leaves a lot of surface and volume of chip available for electronic circuitry, including the processing unit. (Typical chips today are about 20 mm×20 mm).

At this very high rate of information transfer, it can be beneficial if all connectivity between all the elements and units is implemented inside the chip, as by conventional wired connections inside the chip (preferably 65 nanometers or less), and all optical elements are connected locally, with driving and amplification circuitries, i.e., the optical elements are connected electrically to the accompanying electrical elements placed under or close to the optical elements, and in the same chip. This means that, since there are no long electrical connections, power consumption can be limited.

The processing unit 12 can be programmed and re-programmed from outside the chip, by using optical reception interfaces 8 or electrical interfaces 1. When using optical reception interfaces 8 for this purpose, high programming speed and data loading can be achieved. In addition, in this case, the processing unit 12 can be electrically isolated from the board where it is placed. In this way, the processing unit 12, as proposed, can be part of the EO device 14, without being electrically connected to the board. Thus, it can be added or replaced, and programmed from outside, independently. This can be advantageous, as it permits upgrading or performance improvement without touching the existing circuitry. In such embodiments, a data processing network can be provided where several parts (e.g., different in their functionality in general case, but having the same or similar EO interfaces) and having different power supplies may be connected to provide data and commands exchange without power off and cold reboot of the entire system.

The electrical and optical interfaces can allow reception and transmission of a large amount of information from the data received, and then to implement, in a flexible manner, manipulation of the data. This capability of receiving and transmission of a very large amount of data is based on the use of an optical interface built on the surface of a chip. This can permit a data density that is much higher than in the case where data comes from regular electrical interfaces on the back surface of a chip.

In contrast to the typical pitch between optical elements of about 250 microns, a typical size of or pitch between CMOS transistors is currently about 65 nanometers or less. Accordingly, there is at least a difference in size scale of about $10^3$ between the optical elements and electrical elements. Accordingly, numerous high bit rate (or high frequency) electronic circuitry can be placed under each optical element without the need for difficult routing of high speed signals to the edge of chips, as was conventionally done. As a result, the number of serializers and deserializer elements that are needed is significantly reduced and much less power consumption can be achieved.

It will be appreciated that the functioning of the EO device 14 can be monitored from outside the device, by means of one or more interfaces. Thus, both the device itself and the processed data can be monitored externally.

Due in part to the small size and to the electrical, optical and internal processing units, the device 14 can be widely applied in data and telecom equipment, computers, and the like. Such devices are particularly useful when the system requires future upgrades or scalability or functional flexibility, which is not known in advance, or is too complex to be implemented in the first stage.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

The invention claimed is:

1. An integrated circuit chip comprising:
   a plurality of surface contacts to connect to one or more optical components on a top surface of the integrated circuit chip;
   a plurality of back contacts on a back surface of the integrated circuit chip;
   an optical component directly coupled to one or more of said surface contacts, wherein said optical component is an integrated component of said integrated circuit chip; and
   processing circuitry located inside said integrated circuit chip coupled to said surface contacts and said back contacts.

2. The integrated circuit chip according to claim 1, further comprising an electrical component coupled to one or more of said back contacts; wherein said processing circuitry located inside said integrated circuit chip is coupled to said optical component and said electrical component.

3. The integrated circuit chip according to claim 2, wherein said optical component includes optical sources and optical detectors.

4. The integrated circuit chip according to claim 3, wherein said optical sources include a plurality of VCSELs and said optical detectors include a plurality of photodiodes.

5. An integrated circuit chip comprising:
   a plurality of surface contacts on a top surface of a chip;
   a plurality of back contacts on a back surface of the chip;
   an optical interface directly connected to said surface contacts, wherein said optical interface is an integrated component of said integrated circuit chip;
   an electrical interface coupled to said back contacts; and
   processing circuitry located in the integrated circuit chip coupled to said optical and said electrical interfaces.

6. An electro-optical device comprising:
   an optical interface for optical signal transmission and reception;
   an electrical interface for electrical signal transmission and reception;
   a data and signal unit located inside an integrated circuit chip coupled to said optical interface and to said electrical interface for manipulating data received through said interfaces; and
   a processing unit located inside said integrated circuit chip coupled to said optical interface and to said electrical interface for processing digital data received through said interfaces;
   wherein said optical and electrical interfaces, data and signal unit and said processing unit are integrated on a single integrated circuit chip.

7. The electro-optical device according to claim 6, wherein said integrated circuit chip includes CMOS transistors.

8. The electro-optical device according to claim 7, wherein said optical interface is interfaced with a device comprising GaAs, InP, or combinations thereof.

9. The electro-optical device according to claim 8, wherein said device is free of any SiGe layers.

10. The electro-optical device according to claim 7, wherein said optical interface is coupled to said integrated circuit chip via one or more surface contacts on a top surface of said integrated circuit chip.

11. The electro-optical device according to claim 6, wherein said optical interface includes a matrix of active light emitting elements and a matrix of light receiving elements.

12. The electro-optical device according to claim 11, wherein said light emitting elements include VCSELs and said light receiving elements include photodetectors.

13. The electro-optical device according to claim 12, wherein said data and signal unit includes electronic circuitry to drive said VCSELs and electronic circuitry to amplify electric signals received from said photodetectors.

\* \* \* \* \*